United States Patent [19]

Arzouman

[11] Patent Number: 4,589,630

[45] Date of Patent: May 20, 1986

[54] DUAL AUTOMOBILE JACK FOR CONSUMER USE

[75] Inventor: Harry H. Arzouman, Los Angeles, Calif.

[73] Assignee: Safe-T-Jack, Inc., Irvine, Calif.

[21] Appl. No.: 711,380

[22] Filed: Mar. 13, 1985

[51] Int. Cl.⁴ .......... B60P 1/10

[52] U.S. Cl. .......... 254/7 B; 254/8 B; 254/89 R

[58] Field of Search .......... 254/133 R, 134, 7 B, 254/8 B, 89 R, DIG. 1, DIG. 4; 414/427; 403/326, 329

[56] References Cited

U.S. PATENT DOCUMENTS

| | | | |
|---|---|---|---|
| 2,476,762 | 7/1949 | Detre et al. | 403/329 |
| 3,834,669 | 9/1974 | Reid | 54/133 |
| 3,850,419 | 11/1974 | Craig | 254/134 |
| 4,123,038 | 10/1978 | Meyers | 414/427 |
| 4,177,978 | 12/1979 | Warsaw | 254/134 |

*Primary Examiner*—Frederick R. Schmidt
*Assistant Examiner*—Judy J. Hartman
*Attorney, Agent, or Firm*—Gene W. Arant

[57] ABSTRACT

A system of jacking apparatus includes an extendible jack stand with a ratchet for latching it in an extended position, and a power unit which can be selectively engaged with or disengaged from the jack stand. The power unit includes a screw-driven scissors which is interposed between upper and lower plates of the jack stand for raising the jack stand.

The jack stand has a ratchet plate whose lower end protrudes in an exposed location where it can be engaged by a ratchet release member in the power unit.

The power unit is also independently usable as a jack, having a pivotally supported flip-top cover which can be placed over the top of the scissors for engaging and supporting a load.

1 Claim, 12 Drawing Figures

DUAL AUTOMOBILE JACK FOR CONSUMER USE

BACKGROUND OF THE INVENTION

The present invention is an improvement over that disclosed in my U.S. Pat. No. 4,462,569 issued July 31, 1984.

SUMMARY OF THE INVENTION

One object of the invention is to provide a jack system which includes a single power unit and at least two extendible jack stands, which is small and compact and light in weight and easy to use.

Another object of the invention is to provide a jack unit operable as a jack stand for raising a load to a relatively small elevation, and which is also selectively operable as a power unit for driving another jack stand that can raise a load to a higher elevation.

A further object of the invention is to provide a power unit that is operable for raising an extendible jack stand, and which is selectively operable for itself operating as a jack stand.

Still another object of the invention is to provide an extendible jack stand that is of improved construction.

The invention provides a two-part jack system which is small and compact and light in weight and easy to use. An extendible jack stand is generally similar to that shown in my U.S. Pat. No. 4,462,569; however, above the top plate it has a separate bearing plate which supports the load and is carried on a threaded extension shaft which threads into the upper telescoping member, so that the effective height of the jack stand can be adjusted by raising or lowering the extension shaft, while the lifting action is accomplished by applying a lifting force to the under side of the top plate, rather than directly to the bearing plate. The separate power unit has a flat bottom plate which is split at its forward end to provide separate legs that slide upon the bottom plate of the jack stand, and it carries a three-quarter scissors mechanism which is secured upon the bottom plate near the front legs, so that powering of the scissors produces a straight vertical lifting action immediately above the securement location. The power unit is driven by a threaded screw for raising the scissors.

When the power unit is aligned upon the jack stand, attachment is achieved by means of two pins which project laterally outward from the jack stand a short distance above its bottom plate. The legs of the power unit slide upon the bottom plate of the jack stand and underneath those pins, and the power unit also carries spring members which slide over the tops of the respective pins and latch the two units together. Thus each pin of the jack stand is grasped between one leg of the power unit bottom plate and its associated spring member.

For releasing the ratchet mechanism of the jack unit, the preferred form of the present invention provides a spring-loaded ratchet trip member. The ratchet trip is normally held in a restrained position by a support block that is attached to the bottom plate of the power unit. Then when the jack stand is to be lowered, the ratchet trip is lifted by hand so that it clears the support block, and its spring then pulls it toward the jack stand and into hard contact with the exposed lower end of the ratchet plate of the jack stand, thus causing the ratchet to be released and permitting the jack stand to drop down.

In an alternate form of the invention in which the jack stand is provided with a pair of ratchet plates, a pair of ratchet release arms on the power unit are actuated in unison to move towards each other in a closing movement about the lower part of the jack stand, so as to engage and thereby release both of the ratchet plates. The ratchet release arms are then locked in the release position.

Another unique feature of the present invention is the provision of a power unit which also can be independently used as a jack. A flip-top member on the upper end of the three-quarter scissors is normally in a lowered or retracted position, thus permitting the two sides of the scissors to pass on opposite sides of the telescoping members of the jack stand for engaging the two sides of the under surface of its top plate so as to produce the desired lifting action. When the power unit is to be used separately as a jack, however, the flip-top member is flipped up so that it covers the upper end of the scissors and provides an upper support surface which then engages a load from its under side for the purpose of lifting it.

DRAWING SUMMARY

PREFERRED EMBODIMENT

(FIGS. 1–9)

Reference is now made to FIGS. 1 through 9 illustrating the presently preferred form of the invention. In general, the apparatus includes a jack stand J, a power unit P, and a drive crank C. Jack stand J will first be described.

Jack stand J includes a flat bottom plate 10 which is adapted to rest upon any supporting surface such as a street or pavement. See FIGS. 1, 3, 4, 6, and 7. A tube 20 extends vertically upward from plate 10, its lower end being secured to the plate as by welding. See FIGS. 2–4 and 7, 8. Although plate 10 is nearly square, its longer edges may be considered as its sides and its shorter edges as its ends. Two identical pins 21, 22 extend horizontally outward from the sides of tube 20 toward the sides of plate 10, and are spaced a short distance above the plate. Their purpose is for alignment and releasable attachment of the power unit, as will be explained later.

Figure 1:
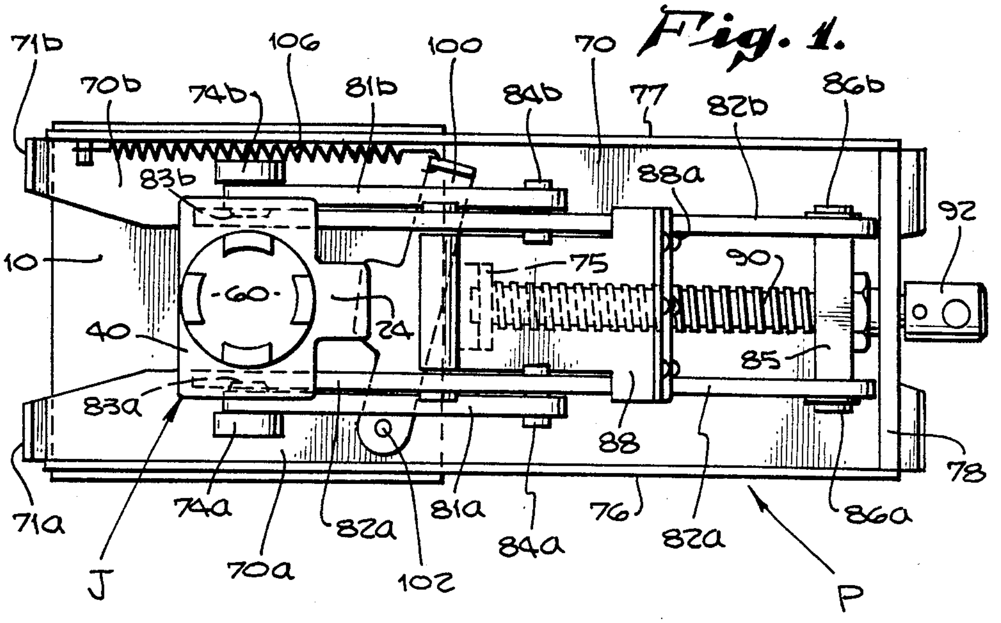
FIG. 1 is a top plan view of the preferred form of the invention, with the jack stand in its lowermost position ready to be lifted by the power unit.
Figure 8:
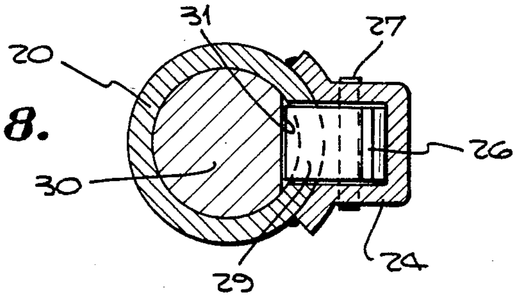
FIG. 8 is a horizontal cross-section view taken on the line 8—8 of FIG. 6 and showing interior details of the latch or ratchet mechanism.
Figure 2:
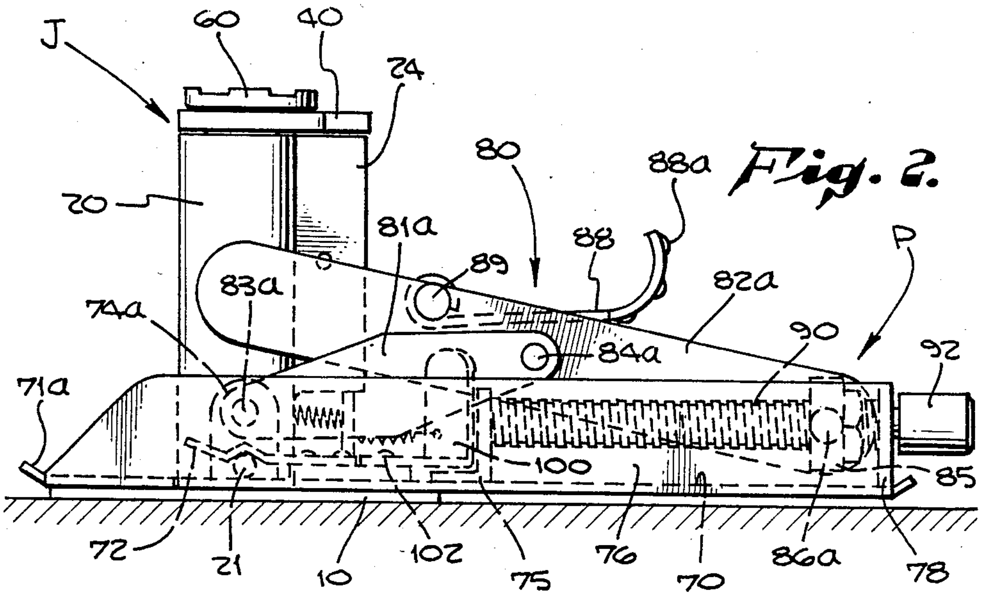
FIG. 2 is a side elevation view of the apparatus of FIG. 1.
Figures 3, 9:
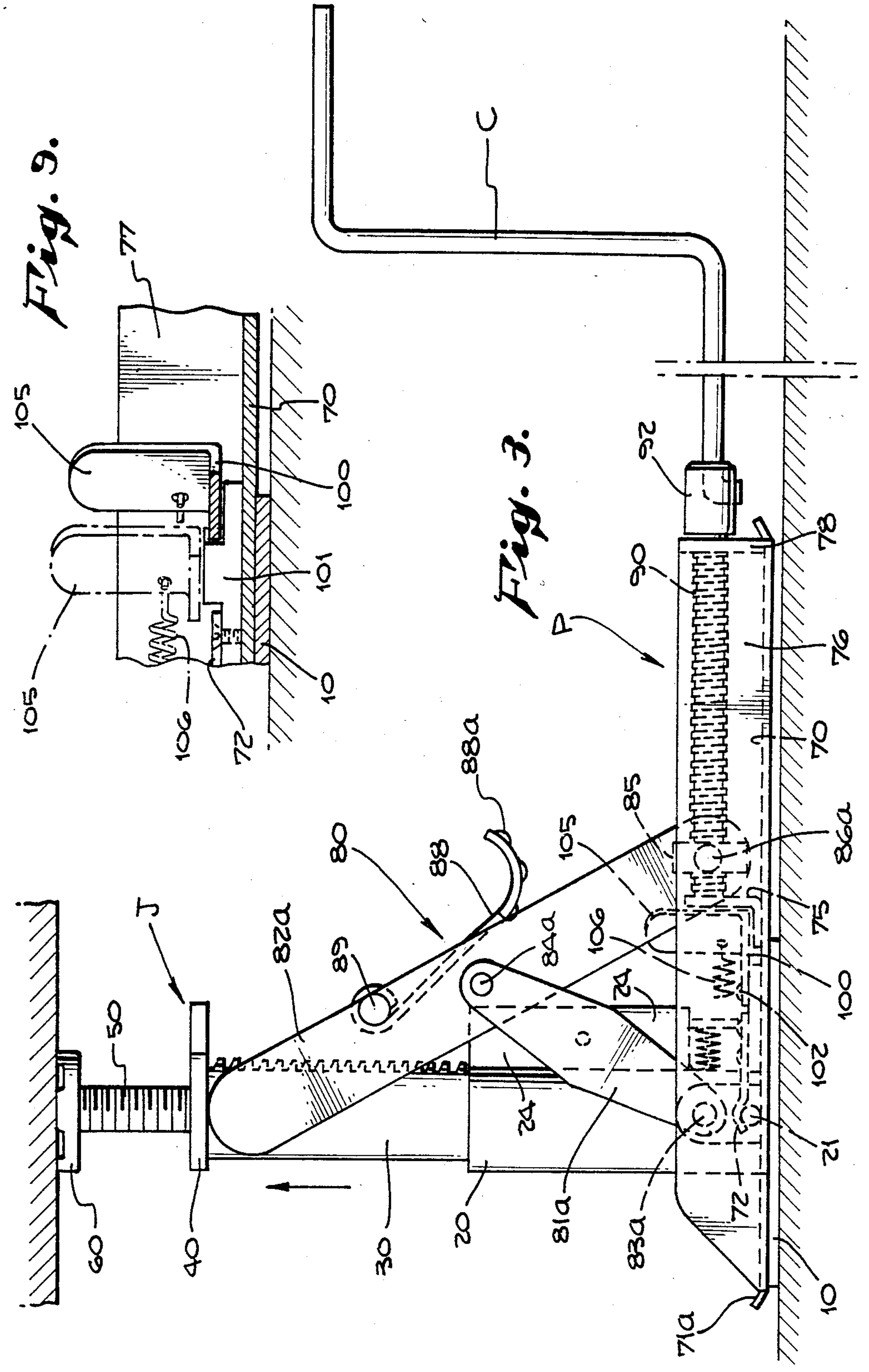
FIG. 3 is a side elevation view like FIG. 2, also showing the drive screw for the power unit, and after the jack stand has been raised for lifting a load.
FIG. 9 is a fragmentary view, partially in cross-section, showing the ratchet trip member of FIGS. 6 and 7, its released position being shown in dotted lines.
Figure 6:
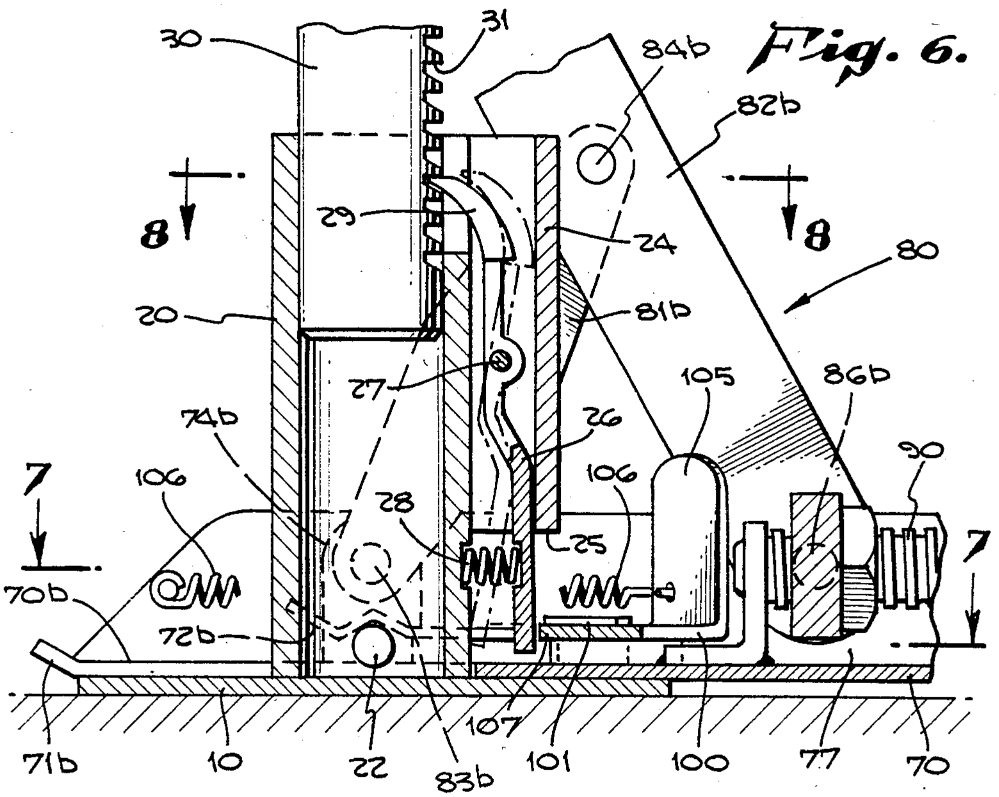
FIG. 6 is an enlarged view of the lower portions of the jack stand and power unit in their FIG. 3 positions, being partially in cross-section and showing the interior ratchet mechanism.

A ratchet housing 24 is attached to the tube 20 adjacent one end of the bottom plate 10. The cross-section of housing 24 is best seen in FIG. 8. Housing 24 has a window 25 cut near its lower end, see FIGS. 4 and 6. A ratchet or latch plate 26 is positioned inside the ratchet housing, see FIG. 6, and is pivotally supported inside the housing by means of a horizontal pivot pin 27 as shown in FIGS. 6 and 8. The lower end of ratchet plate 26 is exposed through the window 25 as shown in FIG. 6. A compression spring 28 extends horizontally between the lower end of the ratchet plate 26 and the outer wall surface of tube 20, its ends being retained in recesses in both of those members.

A vertical shaft 30 has its lower end received within the tube 20, see FIG. 6. Ratchet teeth 31 formed on the shaft 30 are shown in side view in FIGS. 4 and 6 and in horizontal cross-section in FIG. 8. A ratchet tooth or dog 29 formed on the upper end of ratchet plate 26 engages one of the teeth 31. Although not specifically shown in the drawings, the upper end of shaft 30 contains a threaded opening for receiving and supporting an extension shaft 50.

A top plate 40 is secured to the upper end of shaft 30, as by welding. It will therefore be understood that tube 20 and shaft 30 form a pair of telescoping members as disclosed in my above-referenced patent, with the bottom plate 10 and top plate 40 being at the lower and upper ends, respectively, of the telescoping members. Thus, in accordance with the teaching of my above-referenced patent, the scissors mechanism of the power unit is interposed between plates 10 and 40 for extending the jack unit. In accordance with the present invention a load is not placed directly upon the top plate 40, but instead a bearing plate 60 is rotatably secured upon the upper end of extension shaft 50, and the load is carried by the bearing plate 60. See FIG. 3. Extension shaft 50 is threaded, and may be adjusted to protrude a desired distance above the top plate 40, and will then be retained by friction in that desired position of adjustment.

Figure 7:
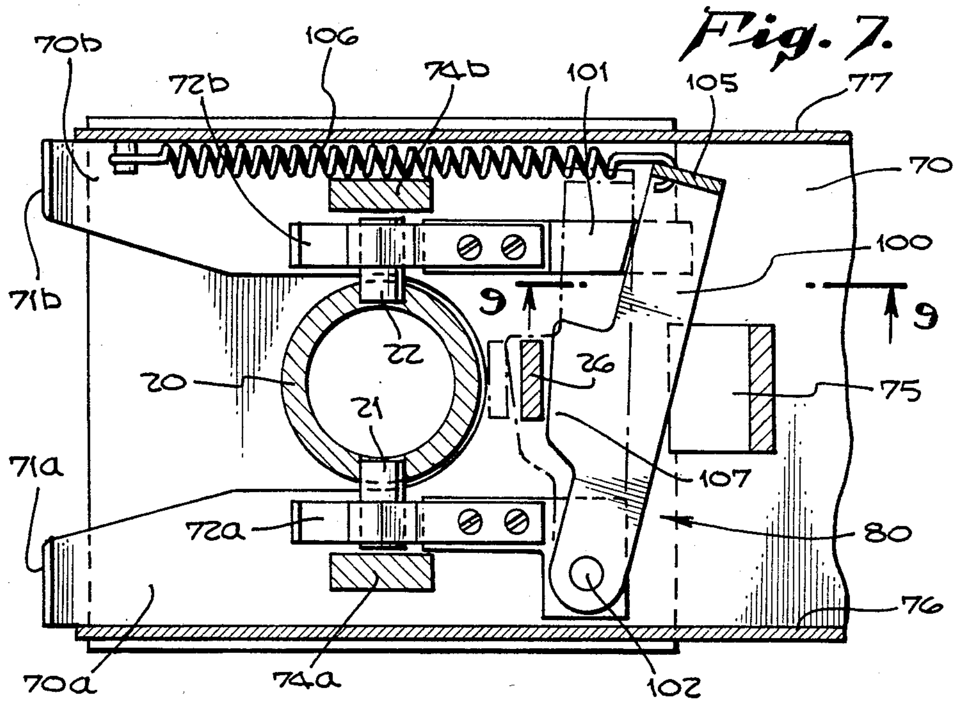
FIG. 7 is a horizontal cross-section view taken on the line 7—7 of FIG. 6, and showing details of the alignment mechanism and of the ratchet trip mechanism.

Power unit P appears in FIGS. 1–7 and 9. It includes an elongated flat bottom plate 70 which is of slightly less width than bottom plate 10 of the jack stand, but is much longer. The forward end of bottom plate 70 is bifurcated to form legs 70*a*, 70*b*. The legs are tapered at their forward inner edges and have their ends upturned to form lifts 71*a*, 71*b*, respectively. As best seen in FIG. 7, a pair of alignment springs 72*a*, 72*b*, are secured above the legs 70*a*, 70*b*, respectively. The rearward end of each spring is fastened down to a block on the associated leg of the bottom plate by means of two small screws, FIG. 7, while its forward portion extends in generally parallel relation to the bottom plate. The forward portion of each spring has a longitudinal notch for receiving one of the pins 21, 22, and its end is curved upwardly. Thus when the power unit P is assembled to the jack stand J, FIG. 6, the springs 72*a*, 72*b*, pass over and latch themselves upon the pins 21, 22, of the jack stand.

A pair of pivot ears 74*a*, 74*b*, are secured upon the legs 70*a*, 70*b*, respectively, just outside the springs 72. Each of these pivot ears supports one forward corner of a scissors assembly 80. See FIGS. 2–7. Some distance to the rear of the legs 70*a*, 70*b*, an L-shaped plate 75 is secured upon the bottom plate 70 for receiving the forward end of a drive screw 90. Bottom plate 70 has side walls 76, 77 of some substantial height to provide protection for the various mechanisms that are carried on the bottom plate. It also has a transverse rear end wall 78 which has a threaded opening for receiving the rearward end of drive screw 90.

Scissors assembly 80 includes a pair of front legs 81*a*, 81*b* which are of only half length, and a pair of main legs 82*a*, 82*b* which are of full length. Pins 83*a*, 83*b* pivotally secure the forward and lower ends of the front legs to respective ones of the pivot ears 74*a*, 74*b*. Pins 84*a*, 84*b* pivotally secure the upper and rearward ends of the front legs to the longitudinal centers of the main legs. A scissors drive plate 85 extends between the rearward and lower ends of the main legs, and is pivotally attached to those legs by means of pins 86*a*, 86*b*, respectively, see FIG. 1. The forward and upper ends of the main legs 82*a*, 82*b* as well as the forward and lower ends of the front legs are located above the springs 72, see FIGS. 1 and 7.

Drive screw 90 has its forward and rearward ends rotatably journaled in the plate 75 and the rear wall 78, respectively. It passes through a threaded opening in the scissors drive plate 85. Thus, driven rotation of the drive screw 90 will cause the scissors to extend in a lifting action, or else to retract, depending upon the direction of rotation. The rearward end of drive screw 90 projects rearward from rear wall 78 and has a coupler 92 attached to it. A removable drive crank C, FIG. 3, may be attached to the coupler for drivingly rotating the drive screw and hence raising or lowering the scissors assembly. The upper and forward ends of the main legs 82*a*, 82*b* are rounded so as to drivingly engage the under surface of top plate 40 of jack stand J, FIG. 3. It will be understood that raising the scissors assembly produces a straight vertical lifting of the top plate 40 and hence of extension shaft 50 and bearing plate 60 and any load carried on the bearing plate.

A ratchet trip member 100, FIGS. 6 and 7, is normally held in a restrained position by a retaining block 101. Block 101 is immediately to the rear of spring 72*b* and secured in fixed position on bottom plate 70. A pivot pin 102 located immediately behind the other alignment spring 72*a* secures one end of trip member 100 in horizontally pivotal relation to the bottom plate. The other end of trip member 100 has an upturned handle portion 105. A tension spring 106 is connected between the trip handle 105 and the forward end of bottom plate leg 70*b*. Trip member 100 is secured rather loosely at the location of pivot pin 102. It is therefore possible to raise handle 105 slightly, so that the trip member clears the upper surface of block 101. Tension spring 106 then pulls the trip member forward, causing its mid-portion 107 to come into hard engagement with the exposed lower end of ratchet plate 26. See FIG. 7, where the position of engagement is shown in dotted lines. It will be seen that plate 75 is located to the rear of trip member 100 and does not interfere with its movement. As shown in FIG. 6, the ratchet plate then assumes its dotted line position and releases its support of shaft 30, if the jack stand is not loaded.

Figure 5:
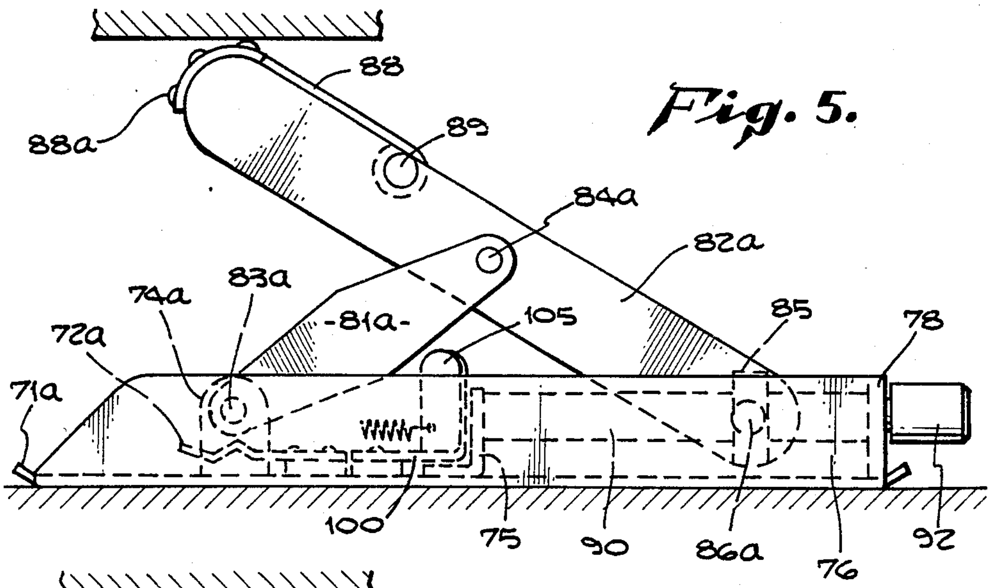
FIG. 5 is a side elevation view of the power unit of FIGS. 1–4, showing it being used independently as a jack for lifting a load.
Figure 4:
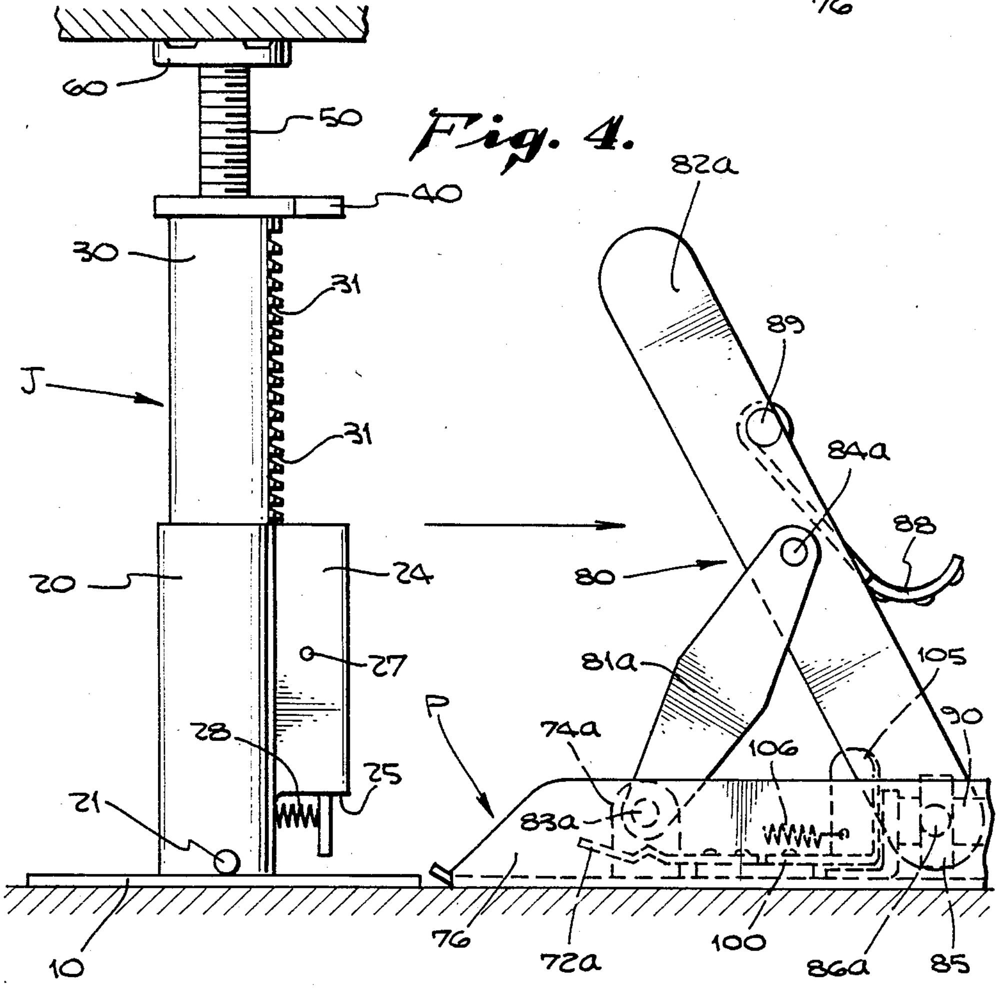
FIG. 4 is a side elevation view like FIG. 3, but showing the power unit detached from the jack stand.

FIG. 5 illustrates an entirely different operation of power unit P. A flip-top member 88 is pivotally secured by means of pivot pin 89 between the main scissors legs. In its retracted position as shown in FIG. 4 it does not interfere with the operation of the power unit in conjunction with jack stand J. As shown in FIG. 4, member 88 lies upon and generally parallel to the middle portion of the scissors main legs. But when raised to its operative postion as shown in FIG. 5, it covers the upper ends of the main legs and also closes the space between the legs.

The power unit P cannot be used with jack stand J when the flip-top member is raised as shown in FIG. 5, because the space between the scissors legs is closed and the legs cannot pass around the opposite sides of the shaft 30. However, it is effective as an independent jack, because the upper end of member 88 presents a continuous surface for supporting a load above and upon it. FIG. 5 specifically shows bumps or protrusions **88*a* on the upper surface of member 88, which are optional, but some special form of load-bearing surface is preferably provided on the upper end of member 88**.

OPERATION OF PREFERRED EMBODIMENT

When the power unit P and jack stand J are used together, they may be aligned and attached together before the jack stand J is placed underneath an automobile or other load. Legs **70*a*, 70*b* of the power unit are tapered at their forward ends and have upturned lifts 71*a*, 71*b*, respectively. These lifts make it easy to slide the bottom plate 70 of the power unit upon bottom plate 10 of the jack stand. At the same time, the lateral spacing between the lifts is such that they pass outside the pins 21, 22, leaving the legs 70*a*, 70*b* captured between bottom plate 10** and those pins. At the same time each pin of the jack stand is grasped between one leg of the power unit bottom plate and its associated spring member. Thus, power unit P may be used as a handle for positioning jack stand J.

Before lifting a load, extension shaft 50 is set at a desired height so that bearing plate 60 actually engages the load.

For lifting the load, drive crank C is attached to the coupler 92. The drive crank is then rotated to drive the scissors drive plate 85 forward, thus lifting the forward ends of main legs **82*a*, 82*b* and raising the top plate 40. With each step upward that the vertical shaft 30 advances, ratchet tooth 29 of plate 26 engages the next ratchet tooth 31**.

When the load has been raised, power unit P may be withdrawn. The crank C is rotated a short distance in reverse, then the power unit is pulled away from the jack stand J, which maintains its position directly supporting the load from the pavement or ground.

To lower the load, power unit P is re-attached to the jack stand J. Then the trip member 100 is raised above block 101 (FIG. 9) so that spring 106 brings it into hard contact with the lower end of ratchet plate 26. This movement causes the ratchet tooth 29 on the upper end of plate 26 to disengage from the ratchet teeth 31, if there is no load on the jack stand, with the result that shaft 30 drops downward. Alternatively, the scissors may be raised to pick up the load, the ratchet mechanism is released, and the drive screw 90 is then cranked in reverse to progressively lower the load.

ALTERNATE EMBODIMENT

(FIGS. 10–12)

Figure 10:
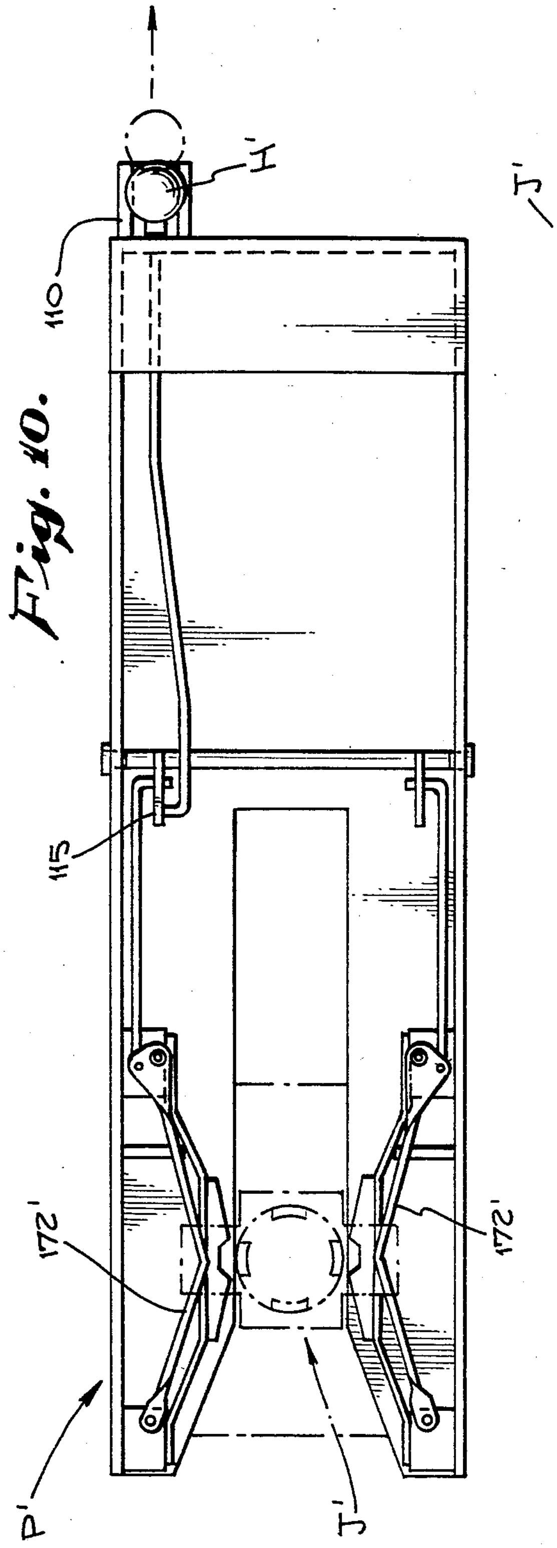
FIG. 10 is a top plan view of an alternate form of the invention.
Figure 12:
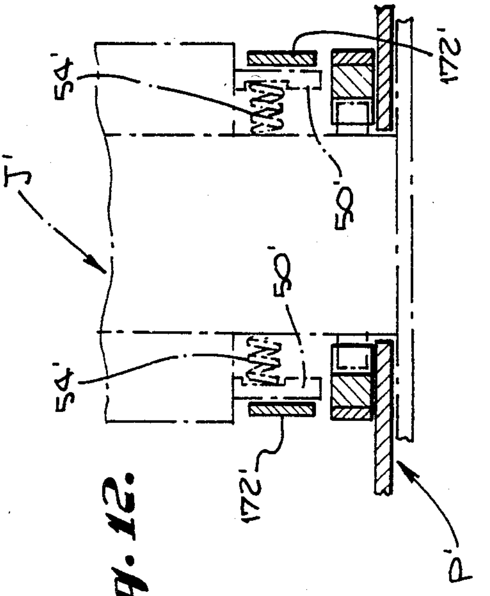
FIG. 12 is a cross-sectional elevation view taken on line 12—12 of FIG. 11, showing details of the ratchet release action.
Figure 11:
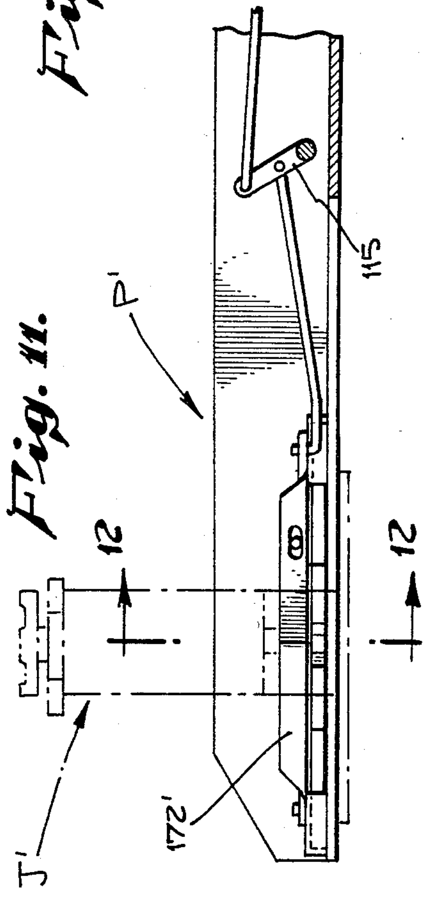
FIG. 11 is a side elevation view, partially in cross-section, of the power unit of FIG. 10, showing its ratchet trip mechanism.

Reference is now made to FIGS. 10–12 illustrating an alternative form of the invention. Jack stand J' (FIG. 12) includes a pair of ratchet plates 50' which are similar to ratchet plates 50 as disclosed in my above-identified referenced patent. Each ratchet plate 50' has its lower end held outward by a compressed spring 54'. Power unit P' includes a pair of ratchet trip members 172'. A hand-operated control knob H' (FIG. 10) may be seated in its retaining seat 110 as shown, and when thus seated drives a lever arm 115 into its downward position as shown in FIG. 10 so that trip members 172' engage the ratchet plates 50'. Other structural features of the alternate embodiment may be the same as in the preferred embodiment. If the jack stand is loaded when trip members 172' engage ratchet plates 50', the ratchet teeth will not release. The scissors (not specifically shown in these drawing figures) may be raised to pick up the load, which will permit the ratchet teeth to disengage, and then the scissors may be driven in reverse to progressively lower the load.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. In a two-part jacking system including an extendible jack stand having a flat base plate, a hollow frame secured to said base plate, and a vertical shaft adapted for telescoping movement within said frame, and a power unit adapted to be aligned with and releasably attached to the jack stand for selectively raising or lowering it, improved alignment and attachment means comprising:

- a pair of pins extending horizontally outward from opposite sides of said hollow frame and spaced above said base plate;
- the power unit having a flat bottom plate which is bifurcated and adapted to slide over said base plate of the jack stand and around the hollow frame but underneath said pins; and
- a pair of elongated spring members supported upon said bottom plate in generally parallel relation thereto and adapted to pass over said pins for releasably attaching the power unit to the jack stand.

* * * * *